No. 869,697. PATENTED OCT. 29, 1907.
O. EILHAUER & P. RÜCKERT.
MICROMETER SCREW GAGE.
APPLICATION FILED FEB. 14, 1907.
Fig. 1.
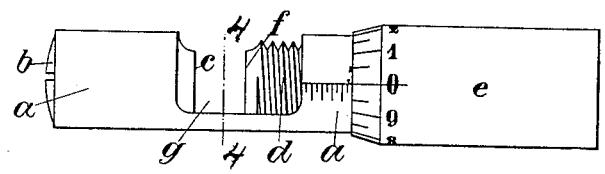
Fig. 2.
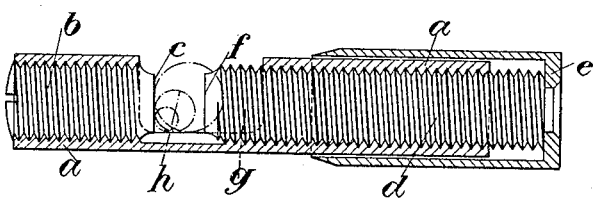
Fig. 3.
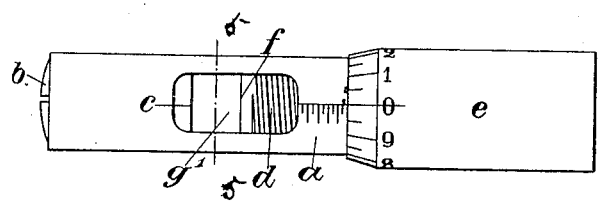
Fig. 4.      Fig. 5.
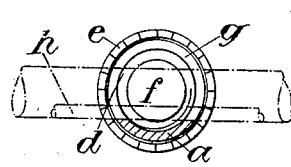   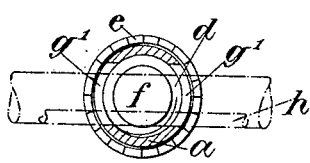

UNITED STATES PATENT OFFICE.

OSKAR EILHAUER, OF NEUSTADT, AND PAUL RÜCKERT, OF GERA, GERMANY.

MICROMETER-SCREW GAGE.

No. 869,697.

Specification of Letters Patent.

Patented Oct. 29, 1907.

Application filed February 14, 1907. Serial No. 357,383.

*To all whom it may concern:*

Be it known that we, OSKAR EILHAUER and PAUL RÜCKERT, subjects of the Emperor of Germany, residing at Neustadt, Saxe-Weimar-Eisenach, and Gera, Reuss, Germany, respectively, have invented certain new and useful Improvements in Micrometer-Screw Gages, of which the following is a full, clear, and exact specification.

The present invention relates to a gage for measuring rods and cylindrical bodies such as wires and the like.

The gage consists of a sleeve forming the nut of a screw spindle with a pitch of exactly 1 mm. and said sleeve is provided with a transverse opening between the measuring surfaces, which is either cut down to the lower edge of the metal of the sleeve or which is cut out on diametrically opposite sides, leaving metal at top and bottom so that the objects to be measured can be passed through the openings and can be gripped between the measuring surfaces.

In the accompanying drawing, forming part of this specification, Figures 1 and 2 are respectively elevation and longitudinal section of the gage with an opening cut in laterally, Fig. 3 shows the instrument with opposite transverse openings, Fig. 4 is a cross-section on line 4—4, Fig. 1, Fig. 5 is a cross-section on line 5—5 of Fig. 3.

A sleeve or tubular casing $a$ is plugged at one end, for instance by turning a screw $b$ into it and securing it subsequently in place. The front end of said plug or screw is squared mathematically true and forms the stationary measuring face $c$. The rear end of the sleeve $a$ is screw-threaded to receive the gage screw $d$ having firmly secured to its rear end a graduated sleeve $e$ overlapping the screw-threaded casing $a$. The front end of the gage screw is also squared and forms the movable measuring face $f$. A longitudinal scale in millimeters is provided on the casing $a$ and a scale at the edge of the outer sleeve $e$ is preferably divided into 10 parts in the well known manner.

The casing $a$ has a deep lateral cut or notch $g$, going down as far as the lowest part of the measuring faces $c$ and $f$ (Fig. 1, 2 and 4) so that between said faces the object to be measured can be placed into the gap. Instead of making this opening from the side, it may be cut transversely, so that metal below and on top remains, which contributes much to strengthen the gage. The width of these diametrically opposite openings is preferably equal to the diameter of the measuring faces, (Fig. 3 and 5). In both cases the object to be measured is introduced into the space between the measuring surfaces and the gage-screw is turned down till it slightly clamps said object. The longitudinal scale shows the thickness in millimeters and the sleeve indicates by its graduation how many tenth of a millimeter have to be added to the showing of the longitudinal scale for giving the exact measurement of the object in the gage.

Having thus described my invention, what I claim is:—

1. A measuring instrument comprising a tubular casing internally screw-threaded and having a transverse opening therein, opposite adjustable members engaging said casing one at each end, and a sleeve surrounding one end of the casing and movable with one of said members.

2. A measuring instrument comprising a tubular casing internally screw-threaded and having a transverse opening therein, an adjustable member engaging said casing at one end, a graduated scale on the casing, and a sleeve having a graduated scale thereon and movable with said adjustable member.

In testimony whereof we affix our signatures.

OSKAR EILHAUER.
PAUL RÜCKERT.

In the presence of—
F. HEPHAM,
CHARLES NEUER.